(12) United States Patent
Sethi

(10) Patent No.: US 11,071,112 B2
(45) Date of Patent: *Jul. 20, 2021

(54) DYNAMICALLY ADJUSTING COMMUNICATION CHANNEL BANDWIDTH

(71) Applicant: Hughes Network Systems, LLC, Germantown, MD (US)

(72) Inventor: Yogesh Sethi, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,029

(22) Filed: Jan. 28, 2020

(65) Prior Publication Data

US 2020/0236678 A1    Jul. 23, 2020

Related U.S. Application Data

(63) Continuation of application No. 15/858,858, filed on Dec. 29, 2017, now Pat. No. 10,560,941.

(51) Int. Cl.
*H04W 4/00* (2018.01)
*H04W 72/04* (2009.01)
(Continued)

(52) U.S. Cl.
CPC ....... *H04W 72/0453* (2013.01); *H04W 28/20* (2013.01); *H04W 72/0413* (2013.01); *H04W 84/06* (2013.01)

(58) Field of Classification Search
CPC ............ H04W 72/0453; H04W 28/20; H04W 72/0413; H04W 84/06
(Continued)

(56) References Cited

U.S. PATENT DOCUMENTS 8,775,631 B2    7/2014   Luna
9,374,161 B2    6/2016   Beeler et al.
(Continued)

FOREIGN PATENT DOCUMENTS

WO   WO 2001069813   9/2001
WO   WO 2006132554   12/2006

OTHER PUBLICATIONS

"Hughes Enable High-Performance 4G/LTE Backhaul via Satellite," Hughes an EchoStar Company, Hughes Network Systems, LLC. H58895 Jul. 17, 4 pages.
(Continued)

*Primary Examiner* — Chuong T Ho
(74) *Attorney, Agent, or Firm* — Fish & Richardson P.C.

(57) ABSTRACT

Methods, systems, and apparatus, including computer programs encoded on a computer storage medium, for adjusting communication channel bandwidth. In some implementations, a method includes determining to change a bandwidth of a wireless communication channel on which a transmitter and receiver communicate. In response, and while the transmitter and the receiver maintain data communication on the wireless communication channel, a target value and rate of change is determined for each of one or more communication parameters of the wireless communication channel. The rate of change is a rate at which the communication parameter can be changed over time while continuing to transfer data on the wireless communication channel. Data is provided to the transmitter. The data can cause, for each communication parameter, the transmitter to gradually adjust the communication parameter using the rate of change until the communication parameter reaches the target value.

20 Claims, 5 Drawing Sheets

(51) Int. Cl.
*H04W 28/20* (2009.01)
*H04W 84/06* (2009.01)

(58) Field of Classification Search
USPC .................................................. 370/329, 330
See application file for complete search history.

(56) References Cited

U.S. PATENT DOCUMENTS

| | | |
|---|---|---|
| 10,560,941 B2 * | 2/2020 | Sethi ................ H04W 72/0453 |
| 10,663,582 B2 * | 5/2020 | Ogawa .................... G01S 7/524 |
| 2009/0051592 A1 | 2/2009 | Lee |
| 2010/0061351 A1 | 3/2010 | Lee |
| 2013/0297743 A1 | 11/2013 | Eschet |
| 2015/0141029 A1 | 5/2015 | Guttman et al. |
| 2016/0028472 A1 | 1/2016 | Valencia |
| 2016/0072574 A1 | 3/2016 | Xu et al. |
| 2018/0003954 A1 | 1/2018 | Shimamoto |
| 2018/0062774 A1 | 3/2018 | Blandino |
| 2018/0302909 A1 | 10/2018 | Ghosh |
| 2019/0052351 A1 | 2/2019 | Fujimura |
| 2019/0074893 A1 | 3/2019 | Kaen |
| 2019/0199508 A1 | 6/2019 | Shinoda |
| 2019/0208522 A1 | 7/2019 | Sethi |
| 2019/0277967 A1 * | 9/2019 | Ogawa .................... G01S 15/04 |
| 2020/0236678 A1 * | 7/2020 | Sethi .................... H04W 28/20 |

OTHER PUBLICATIONS

"Satellite Cellular Backhaul Solutions," Hughes an EchoStar Company, Hughes Network Systems, LLC. 2014, 4 pages.

* cited by examiner

DYNAMICALLY ADJUSTING COMMUNICATION CHANNEL BANDWIDTH

CROSS-REFERENCE TO RELATED APPLICATIONS

This application is a continuation of U.S. application Ser. No. 15/858,858, filed Dec. 29, 2017, now allowed, which is incorporated by reference in its entirety.

BACKGROUND

Communications satellites are commonly used to transmit data between gateways and terminals. For example, communications satellites are used to provide Internet access to many users. Communications satellites can also be used for cellular backhauling. In both examples, the amount of bandwidth required by a satellite terminal can vary over time.

SUMMARY

In some implementations, a communications system can dynamically re-define wireless communication channels while the channels are in use, in a manner that does not disrupt data transfer or require buffering of data. For example, the TDM frequency bandwidth of a satellite communication channel can be changed while a transmitter and receiver maintain data communication over the course of the change. For example, a transmitter can adjust communication parameters (e.g., center frequency or frequency bandwidth) of a wireless communication channel gradually so that a receiver that is receiving data transmissions from the transmitter can track the wireless communication channel as it is adjusted. For example, receivers that are configured to receive data over a particular wireless communication channel can typically adjust to minor changes (e.g., less than a threshold amount) to the wireless communication channel due to normal fluctuations in the actual center frequency or frequency bandwidth of the wireless communication channel. By gradually adjusting the communication parameters at (or below) a rate of change to which the receiver can adapt, the transmitter and receiver can maintain an active communication link while the channel parameters are being adjusted.

A computing device can determine to adjust the center frequency or bandwidth of the wireless communication channel. The determination can be made based on expected bandwidth demand, in response to a request to adjust the bandwidth of the wireless communication channel, or in response to adjustments to communication parameters of one or more other wireless communication channels.

Some prior approaches for changing the frequency bandwidth for a channel have involved relatively abrupt changes in communication parameters. These abrupt changes typically disrupt data communication over the wireless communication channel, or require buffering of data in advance to avoid disruption. Further, some changes have incurred significant delays in data transfer while control messages are exchanged and the adjustments to channel parameters are made. If data buffering is used to minimize disruption, additional planning and data storage resources are needed to buffer data until data communication is re-established on the wireless communication channel.

By contrast with prior approaches, the technique discussed in this document allows gradual, coordinate adjustment of the communication parameters so that the data communication is not disrupted, even as channel parameters such as frequency bandwidth and center frequency are changed. An active communication link between the transmitter and the receiver can be maintained before the communication parameters are adjusted, while the communication parameters are being adjusted, and after the wireless communication parameters are adjusted. This reduces the latency in transmitting data, reduces the amount of data storage resources needed, allows for the dynamic adjustment of wireless communication channels without disrupting data communication, and allows for the dynamic expansion of a wireless communication frequency spectrum without data disruption or data loss.

Adjustments to the communication parameters of multiple communication channels can be coordinated such that the wireless communication channels do not overlap, which could introduce interference onto one or more of the wireless communication channels. For example, if the frequency bandwidth of a first wireless communication channel is going to be expanded, the center frequency or frequency bandwidth of a second wireless communication channel adjacent to the first wireless communication channel (and potentially other wireless communication channels) may be adjusted to prevent overlap in the frequency ranges of the two wireless communication channels. As described below, the start times of each adjustment can be determined based on the rates of change of the communication parameters, the current values of the communication parameters, and the target values of the communication parameters to avoid frequency overlap between the wireless communication channels and to prevent or reduce interference between the wireless communication channels.

The techniques for adjusting communication parameters described herein allow for more efficient use of a satellite frequency spectrum. For example, the satellite frequency spectrum can be dynamically re-allocated to adjust for varying demand among the satellite wireless communication channels within the spectrum. The frequency ranges of the satellite communication channels can be adjusted (e.g., increased or decreased, and/or or shifted) to align spectrum usage to current demand on a per-channel basis and/or to avoid or reduce interference between the channels. For example, if the data demand of a first satellite communication channel is increasing, the bandwidth of other satellite channels that have more than enough bandwidth can be dynamically reduced and the other satellite channels can be dynamically shifted along the frequency spectrum to allow for an expansion of the bandwidth of the first wireless communication channel. The re-allocation can also occur without delay in satellite communication and without data loss.

In one general aspect, the techniques disclosed herein describe methods of adjusting communication parameters of wireless communication channels. According to some of the methods, one or more computing devices determine to change a bandwidth of a wireless communication channel on which a transmitter and a receiver communicate. In response to the determination, and while the transmitter and the receiver maintain data communication on the wireless communication channel: the one or more computing devices determine, for each of one or more communication parameters of the wireless communication channel, a target value for the communication parameter; identify a rate of change for each of the one or more communication parameters; and provide, to the transmitter and for each of the one or more communication parameters, data that causes the transmitter to gradually adjust the communication parameter using the rate of change for the communication parameter until the communication parameter reaches the target value for the communication parameter. The one or more communication parameters can include at least one of (i) a center frequency of the wireless communication channel or (ii) a frequency bandwidth of the wireless communication channel. The rate of change for each communication parameter can be a rate at which the communication parameter can be changed over time while continuing to transfer data on the wireless communication channel.

In some implementations, the rate of change for each communication parameter is based on a maximum rate of change for the communication parameter for which the receiver is capable of tracking changes to the communication parameter and maintaining communication with the transmitter over the wireless communication channel.

In some implementations, the transmitter includes a satellite transmitter. The receiver can include a satellite receiver. The satellite transmitter transmits data to the satellite receiver by way of a satellite and using a satellite communication link over the wireless communication channel.

In some implementations, the transmitter gradually adjusts each of the one or more communication parameters over a time period. The transmitter and the receiver maintain an active communication link over the wireless communication channel during the time period. The receiver receives, from the transmitter, multiple data transmissions over the wireless communication channel during the time period. A value of each of the one or more communication parameters can be different for at least two of the data transmissions.

In some implementations, the transmitter gradually adjusts each of the one or more communication parameters in multiple increments. A value of the one or more communication parameters is different for each increment. The receiver receives, from the transmitter and over the wireless communication channel, a data transmission at a multitude of the increments.

Some implementations include determining to change one or more second communication parameters of a second wireless communication channel based on the change in bandwidth of the wireless communication channel. A second transmitter and a second received communicate on the second wireless communication channel. For each of one or more second communication parameters of the second wireless communication channel, the one or more computing devices can determine a second target value for the second communication parameter. The one or more second communication parameters can include at least one of (i) a center frequency of the second wireless communication channel or (ii) a frequency bandwidth of the second wireless communication channel. The one or more computing devices can identify a second rate of change for each of the one or more second communication parameters. The second rate of change for each second communication parameter can be a rate at which the second communication parameter can be changed over time while continuing to transfer data on the second wireless communication channel. The one or more computing devices can provide, to the second transmitter and for each of the one or more second communication parameters, data that causes the second transmitter to gradually adjust the second communication parameter using the second rate of change for the second communication parameter until the second communication parameter reaches the second target value for the second communication parameter.

Some implementations include coordinating the gradual adjustment to the one or more communication parameters by the transmitter and the gradual adjustment to the one or more second communication parameters by the second transmitter. The one or more computing devices can determine, for the transmitter, a first start time for the transmitter to start gradually adjusting each of the one or more communication parameters. The one or more computing devices can determine, for the second transmitter, a second start time for the second transmitter to start gradually adjusting each of the one or more second communication parameters. The one or more computing devices can provide the first start time to the first transmitter and provide the second start time to the second transmitter.

In some implementations, the first start time and the second start time are determined such that the communication channel and the second communication channel do not overlap in transmission frequencies during the adjustment to the communication parameters and the adjustment to the second communication parameters.

In some implementations, determining to change the bandwidth of the wireless communication channel can include determining to change the bandwidth based on at least one of (i) receiving, from the transmitter, a request to change the bandwidth, (ii) historical bandwidth demand of the transmitter, (iii) an adjustment to a center frequency or frequency bandwidth of a second wireless communication channel, (iv) an addition of a third wireless communication channel to a frequency spectrum that includes the wireless communication channel, or (v) removal of a fourth wireless communication channel from the frequency spectrum.

Other embodiments include corresponding systems, apparatus, and software programs, configured to perform the actions of the methods, encoded on computer storage devices. For example, some embodiments include a satellite terminal and/or a satellite gateway configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
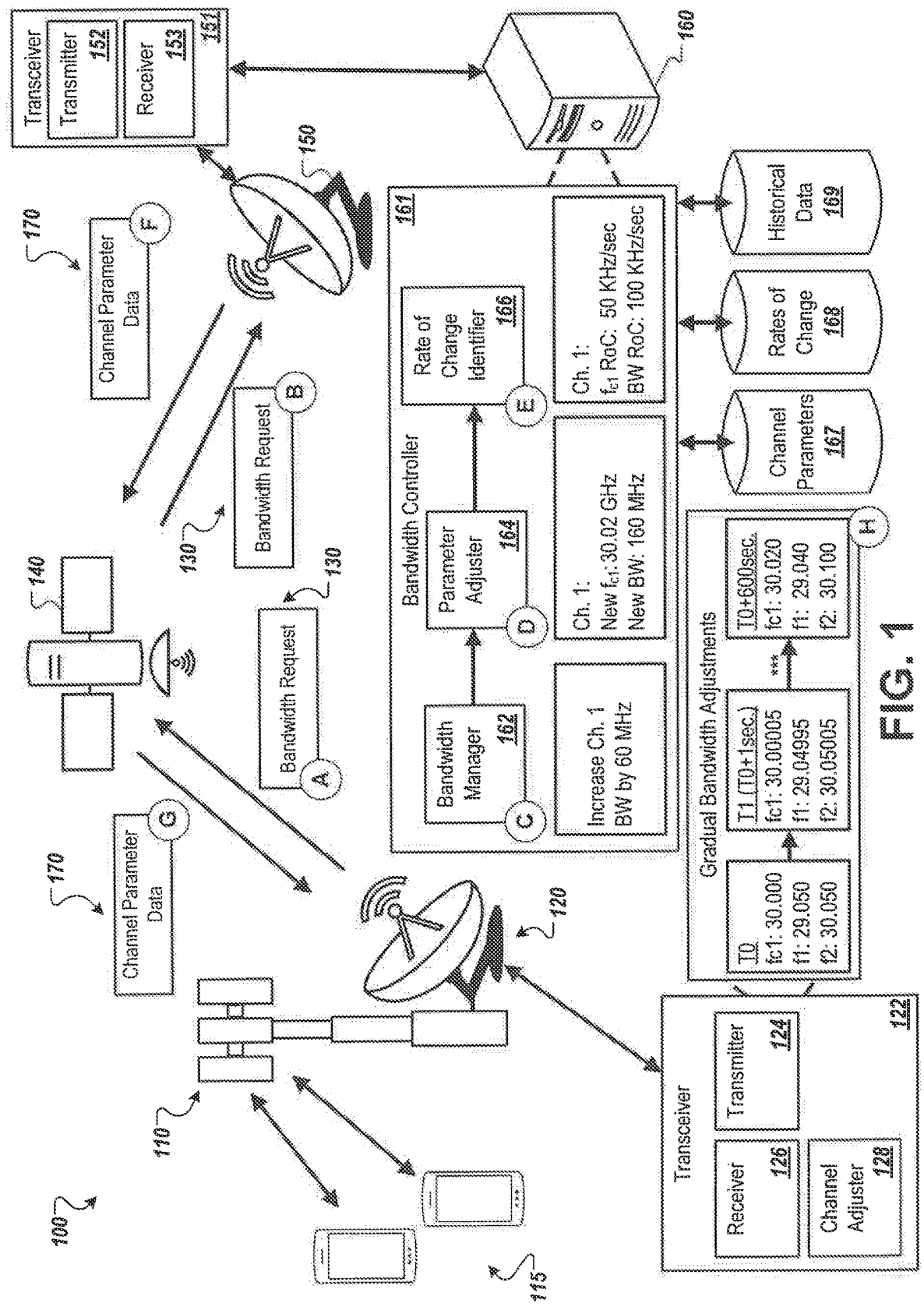
FIG. 1 is a diagram that illustrates an example of a system for adjusting communication channel bandwidth.

FIG. 1 is a diagram that illustrates an example of a system 100 for adjusting communication channel bandwidth. The system includes a satellite gateway 150 that communicates with a satellite terminal 120 by way of a satellite 140. The satellite gateway 150, the satellite terminal 120, and the satellite 140 can be part of a satellite communication network that includes one or more satellites, one or more satellite gateways, and one or more satellite terminals.

In the illustrated example, the satellite terminal 120 is being used for cellular backhauling. In a cellular backhauling operation, the satellite terminal 120 provides satellite data communication between mobile phones 115 and the gateway 150. The mobile phones 115 can send data to, and receive data from, a cell tower 110. The satellite terminal 120 can receive data from the mobile phones 115 by way of the cell tower 110 and provide the data to the gateway 150 by way of the satellite 140. Similarly, the satellite terminal 120 can receive data intended for a mobile phone 115 from the gateway 150 by way of the satellite 140 and provide the data to the mobile phone 115 by way of the cell tower 110. The techniques described herein can also be applied to other uses of satellite terminals and other types of satellite terminals, such as mobile satellite terminals.

The satellite terminal 120 includes a transceiver 122 with a transmitter 124, a receiver 126, and a channel adjuster 128. The transmitter 124 transmits data over a wireless communication channel between the satellite terminal 120 and the satellite 140. Similarly, the receiver 126 receives data over a wireless communication channel between the satellite terminal 120 and the satellite 140. As described below, the channel adjuster 128 can adjust channel parameters of the satellite transmitter 124.

The satellite gateway 150 also includes a transceiver 151 with a transmitter 152 and a receiver 153. The transmitter 151 transmits data over a wireless communication channel between the satellite gateway 150 and the satellite 140. Similarly, the receiver 153 receives data over a wireless communication channel between the satellite terminal 150 and the satellite 140.

Each wireless communication channel used by the satellite terminal 120, the satellite gateway 150, and the satellite 140 can be defined by a range of frequencies between a lower frequency and an upper frequency. The range of frequencies for a wireless communication channel includes a center frequency that is measure of a central frequency between the upper and lower frequencies of the wireless communication channel. Wireless communication channels for satellite communication are typically within the Ka-band, which includes frequencies in the range of 26.5-40 gigahertz (GHz), or the Ku-band, which includes frequencies in the range of 12-18 GHz.

An example wireless communication channel for satellite communication may have a center frequency of 30 GHz, an upper frequency of 30.1 GHz, and a lower frequency of 29.9 GHz. The frequency bandwidth of a wireless communication channel is equal to the difference between the upper frequency and the lower frequency of the wireless communication channel. For this example, the frequency bandwidth would be 0.2 GHz (30.1 GHz-29.9 GHz).

In some implementations, the satellite terminal 120, the satellite 140, and the satellite gateway 150 use time-division multiplexing (TDM) techniques for transmitting and receiving data. In this example, the wireless communication channels used to exchange data between the satellite terminal 120 and the satellite gateway 150 can be persistent communication links that are maintained for an indefinite period of time. This allows the satellite terminal 120 and the satellite gateway 150 to perform cellular backhauling operations.

The symbol rate of a wireless communication channel is based on the frequency bandwidth and the coding of the wireless communication channel. In general, the symbol rate increases with an increase in frequency bandwidth. For purposes of brevity, the bandwidth adjustments of the system 100 of FIG. 1 are described in terms of adjustments in frequency bandwidth of wireless communication channels. However, the same (or similar) techniques can be used to adjust the symbol rates of the wireless communication channels. For example, the target values and rates of change described below can be in terms of symbol rates rather than frequency bandwidth.

The transceiver 151 of the satellite gateway 150 is in data communication with a computing device 160, e.g., over a wired, wireless, or network connection. The computing device 160 includes a bandwidth controller 161. The bandwidth controller 161 can manage the wireless communication channels for a set of one or more satellite terminals, one or more satellite gateways, and one or more satellites that communicate within a particular frequency spectrum. The set of one or more satellite terminals, one or more satellite gateways, and one or more satellites include the satellite terminal 120, the satellite gateway 150, and the satellite 140.

The bandwidth controller 161 can determine when to add a wireless communication channel within the frequency spectrum and when to remove a wireless communication channel from the frequency spectrum. The bandwidth controller 161 can also determine and adjust communication parameters of the wireless communication channels within the frequency spectrum. The communication parameters for a wireless communication channel adjusted by the bandwidth controller 161 can include the center frequency of the wireless communication channel and/or the frequency bandwidth of the wireless communication channel.

For example, the bandwidth controller 161 can expand the frequency bandwidth of a wireless communication channel in response to a request to expand the frequency bandwidth (e.g., received from a transmitter transmitting data over the wireless communication channel) or in response to historical bandwidth demand of the transmitter transmitting data over the wireless communication channel. The bandwidth controller 161 can also adjust the frequency bandwidth and/or center frequency of a wireless communication channel in response to an adjustment to a center frequency or frequency bandwidth of a different wireless communication channel, in response to an addition of a new communication channel to a frequency spectrum that includes the wireless communication channel, in response to removal of a wireless communication channel from the frequency spectrum, and/or to make room in the frequency spectrum in case another wireless communication channel is added later.

In the example of FIG. 1, during stage (A), the satellite transmitter 124 transmits a request 130 for a bandwidth adjustment for the wireless communication channel ("Channel 1") on which the transmitter 124 is transmitting data. For example, if there is an increase in the number of mobile phones 115 requesting to exchange data by way of the cell tower 120 or an increase in the amount of data that the mobile phones 115 are requesting to exchange by way of the cell tower 120, the transmitter 124 can transmit a request 130 for additional bandwidth to the satellite 140. Similarly, if there is a decrease in the number of mobile phones 115 requesting to exchange data by way of the cell tower 120 or a decrease in the amount of data that the mobile phones 115 are requesting to exchange by way of the cell tower 120, the transmitter 124 can transmit a request 130 for a reduction in bandwidth to the satellite 140. The request 130 can specify an amount of additional or less bandwidth requested or simply request more or less bandwidth.

During stage (B), the satellite 140 transmits forwards the request 130 to the satellite gateway 150.

During stage (C), a bandwidth manager 162 of the bandwidth controller 161 receives the request 130 (or the data of the request 130) and determines whether to adjust one or more communication parameters (e.g., the center frequency or the frequency bandwidth) of Channel 1. In some implementations, the bandwidth manager 162 determines whether to adjust the frequency bandwidth of Channel 1 based on communication parameters of other wireless communication channels (e.g., Channel 2 or another channel). For example, if the other wireless communication channels in the frequency spectrum (e.g., the frequency spectrum managed by the bandwidth controller 161) are at or near capacity and there is no additional available bandwidth in the frequency spectrum, the bandwidth manager 162 can determine to not increase the bandwidth of Channel 1. If the bandwidth of another wireless communication channel in the frequency spectrum can be reduced or if there is available bandwidth in the frequency spectrum, the bandwidth manager 162 can determine to increase the bandwidth of Channel 1.

To determine whether to adjust the frequency bandwidth of Channel 1 based on the communication parameters of other wireless communication channels, the bandwidth manager 162 can determine an amount of frequency bandwidth being used (e.g., by determining a sum of the frequency bandwidths of the wireless communication channels that are active in the frequency spectrum). The bandwidth manager 162 can then subtract the amount of frequency bandwidth being used from the total frequency bandwidth of the frequency spectrum to determine the amount of frequency bandwidth available in the frequency spectrum. If there are buffers of frequencies between adjacent carriers (e.g., to prevent or reduce interference between channels), the amount of bandwidth consumed by the buffers can be subtracted from the amount of frequency bandwidth available. If there is frequency bandwidth available, the bandwidth controller 162 can increase the frequency bandwidth of Channel 1.

In this example, the bandwidth manager 162 has determined to increase the bandwidth of Channel 1 by 60 megahertz (MHz). The original frequency bandwidth of Channel 1 is 100 MHz. Thus, target frequency bandwidth after the adjustment is 160 MHz.

In another example, the bandwidth manager 162 can determine to adjust the frequency bandwidth of the Channel 1 based on historical data regarding the bandwidth demand of Channel 1 and/or historical data regarding the bandwidth demand of the transmitter 124 and the receiver 153. For example, the bandwidth controller 161 can monitor the bandwidth demands of Channel 1 and other channels (or pairs of transmitters and receivers) and store the monitored data in a historical data store 169, which can be implemented in one or more data storage devices (e.g., one or more hard drives, flash memory, etc.). If the historical data indicates that more data is transmitted over Channel 1 (and/or between the transmitter 124 and the receiver 153) during particular time periods (e.g., during daylight hours), the bandwidth manager 162 can determine to increase the bandwidth of Channel 1 at or before the particular time periods. In this example, the bandwidth manager 162 can also determine to reduce the frequency bandwidth of Channel 1 after the particular time periods (e.g., during nighttime hours). The bandwidth manager 162 can use one or more machine learning models trained using the historical data to determine when to adjust the frequency bandwidth of Channel 1 and the other channels.

In another example, the bandwidth manager 162 can determine to adjust the frequency bandwidth of Channel 1 based on an adjustment to the frequency bandwidth of another wireless communication channel in the frequency spectrum, based on an addition of a new wireless communication channel to the frequency spectrum, or based on the removal of a wireless communication channel from the frequency spectrum. For example, the bandwidth manager 162 can receive a request to increase the frequency bandwidth of another wireless communication channel. The bandwidth manager 161 can also determine, based on the historical data, that the frequency bandwidth of Channel 1 can be reduced. In response, the bandwidth manager 162 can reduce the frequency bandwidth of Channel 1 based on the amount of bandwidth needed by Channel 1 and the amount of additional frequency bandwidth requested by the other wireless communication channel.

Similarly, if another wireless communication channel is being added to the frequency spectrum and the frequency spectrum does not have enough available frequency bandwidth for the other wireless communication channel, the bandwidth manager 162 can reduce the frequency bandwidth of Channel 1 based on the amount of frequency bandwidth need by Channel 1 and the amount of frequency bandwidth needed for the other wireless communication channel. If a wireless communication channel is removed from the frequency spectrum, the bandwidth manager 162 can increase the frequency bandwidth of Channel 1 to allow for faster communication over Channel 1.

During stage (D), a parameter adjuster 164 of the bandwidth controller 164 adjusts the communication parameters of Channel 1 (and optionally other wireless communication channels) based on the determination to increase the bandwidth of Channel 1 by 60 MHz. The parameter adjuster 164 can adjust the frequency bandwidth of Channel 1 from 100 MHZ to a target frequency bandwidth of 160 MHz based on the bandwidth manager's determination to increase the bandwidth of Channel 1 by 60 MHz.

The parameter adjuster 162 can maintain the communication channel parameters for each wireless communication channel in a channel parameters data store 167, which can be implemented in one or more data storage devices. In this way, the parameter adjuster 162 can access the communication parameters of the wireless communication channels to determine how to adjust the communication channel parameters to accommodate changes in frequency bandwidth for the wireless communication channels and/or additions or deletions of wireless communication channels from the frequency spectrum.

In addition to adjusting the frequency bandwidth of Channel 1, the parameter adjuster 164 can determine to adjust the center frequency of Channel 1, e.g., based on an adjustment to the frequency bandwidth of Channel 1. For example, there may be more available frequencies to one side of the range of frequencies of the Channel 1 (e.g., the upper frequency side) than the other side (e.g., the lower frequency side). In this example, the bandwidth manager 162 can expand Channel 1 to the one side (or more to the one side than to the other side), by adjusting the center frequency of Channel 1 towards to one side and increasing the frequency bandwidth of Channel 1.

In the example of FIG. 1, the parameter adjuster 164 determined to adjust the center frequency of Channel 1 ($f_{c1}$) by 20 MHz from a center frequency of 30 GHz to a target center frequency of 30.02 GHz. For example, there may be more available frequencies above the upper frequency of Channel 1 than there are below the lower frequency of Channel 1. The parameter adjuster 164 can shift the frequency band of Channel 1 by 20 MHz to prevent interference with the wireless communication channel adjacent to Channel 1 on the lower frequency side of channel 1 below the lower frequency of Channel 1.

The parameter adjuster 164 can also determine to adjust one or more communication parameters of one or more other wireless communication channels based on the adjustment to the frequency bandwidth of Channel 1. For example, to accommodate the additional frequencies of the target frequency bandwidth of Channel 1, the parameter adjuster 164 can determine to shift the center frequency of an adjacent wireless channel away from Channel 1 to prevent interference between the adjacent wireless communication channel and adjusted Channel 1. In another example, the parameter adjuster 164 can determine to shift adjacent wireless communication channels on either side of Channel 1 away from Channel 1 to prevent interference between the adjacent wireless communication channels and adjusted Channel 1.

In another example, the parameter adjuster 164 can shift multiple wireless communication channels on one or both sides of Channel 1. For example, to shift an adjacent wireless communication channel away from Channel 1, the parameter adjuster 164 can determine that another wireless communication channel should be shifted to accommodate the shift to the adjacent wireless communication channel.

The parameter adjuster 164 can determine which wireless communication channels for which to adjust communication parameters based on the current communication parameters of the wireless communication channels in the frequency spectrum, the adjustments to the communication parameter(s) of Channel 1, and any frequency buffer to maintain between pairs of wireless communication channels. For example, the parameter adjuster 164 can determine, based on the center frequency of an adjacent wireless communication channel, the frequency bandwidth of the adjacent wireless communication channel, the target frequency bandwidth of Channel 1 and the target center frequency of Channel 1, that the adjusted frequency band of Channel 1 will overlap with the frequency bandwidth of the adjacent wireless communication channel. In response, the parameter adjuster 164 can determine that the adjacent wireless communication channel should be shifted.

If the parameter adjuster 164 determines to adjust the communication parameters of another wireless communication channel, the parameter adjuster 164 can determine target values for the communication parameters of the other wireless communication channel. For example, if the parameter adjuster 164 determines to shift an adjacent wireless communication channel away from Channel 1, the parameter adjuster can determine a target center frequency for the adjacent wireless communication channel that accomplishes the desired shift.

The parameter adjuster 164 can also coordinate the adjustments of Channel 1 and other wireless communication channels using start times for the adjustments. For example, the parameter adjuster can determine a start time for each communication parameter that is going to be adjusted. The start time for a communication parameter can indicate a time at which a transmitter is to begin adjusting the communication parameter. If the communication parameter(s) for multiple wireless communication channels are going to be adjusted, the parameter adjuster 164 can determine the start time for each communication parameter to coordinate the adjustments in way that prevents or reduces interference between the wireless communication channels.

The parameter adjuster 164 can determine the start times based on the rates of change of the communication parameters, the current values of the communication parameters, and the target values of the communication parameters to avoid frequency overlap between the wireless communication channels and to prevent or reduce interference between the wireless communication channels. For example, if the adjustment to Channel 1 would cause Channel 1 to overlap in frequencies with another channel (e.g., Channel 2), the parameter adjuster 164 can determine start times for changes to Channels 1 and 2 such that Channel 2 is shifted before Channel 1 overlaps with Channel 2. If the rate of change for the communication parameter(s) of Channel 2 are equal to, or faster than, the rate of change for the same communication parameter(s) for Channel 1, the start times for Channels 1 and 2 can be the same. If the rate of change for the communication parameter(s) of Channel 2 are equal to, or faster than, the rate of change for the same communication parameter(s) for Channel 1, the start time for Channel 2 can be earlier than the start time for Channel 1. Examples of adjustments to wireless communication channels are illustrated in FIGS. 2-5 and described below.

During stage (E), a rate of change identifier 166 identifies a rate of change for each wireless communication parameter that is going to be adjusted. The rate of change for a communication parameter is a rate at which the communication parameter is to be gradually (e.g., incrementally or continuously) changed over time. For example, the rate of change for a center frequency can be a frequency value over unit time (e.g., 50 KHz per second). Similarly, the rate of change for frequency bandwidth can be a frequency value over time (e.g., 100 KHz per second).

The rate of change of a communication parameter for a wireless communication channel can be based on the capabilities of the receiver that is receiving data over the wireless communication channel. For example, a receiver may have a maximum rate of change for each communication parameter for which the receiver is capable of tracking the adjustments to the communication parameter and maintaining an active wireless communication link with the transmitter.

If the transmitter changes the communication parameter at a rate that is higher than the maximum rate of change, the receiver may not be able to track the transmitter and the wireless communication link may be lost. If the transmitter changes the communication parameter at a rate that is equal to or less than the maximum rate of change, the receive can track the transmitter and maintain the active wireless communication link while the communication parameter is being adjusted at the transmitter. With the active wireless communication link, the receiver can continue to receive data from the transmitter during the adjustment and without disruption. Thus, the rate of change for a communication parameter for a receiver can be equal to or less than the maximum rate of change for the communication parameter for the receiver.

The rates of change for each receiver (or wireless communication channel can be stored in a rate of change data store 168, which can be implemented in one or more data storage devices. Each rate of change can be stored with reference to the receiver and/or wireless communication channel to which the rate of change applies. For example, the rate of change data store 168 can include a table that includes, for each receiver, a row that includes the receiver's center frequency rate of change and the receiver's bandwidth frequency rate of change.

The rate of change identifier 166 can access the rate of change data store 168 and retrieve the rate of change for each communication parameter that is to be adjusted. For example, the rate of change identifier 166 can receive, from the parameter adjuster 164, data specifying the communication parameters that are being adjusted and retrieve the appropriate rate of change for each communication parameter. The rate of change identifier 166 can retrieve the rate of change for a communication parameter based on the receiver of the wireless communication for which the communication parameter is being adjusted.

In the example of FIG. 1, the rate of change identifier 166 has identified a rate of change of 50 KHz per second for the center frequency of Channel 1 and a rate of change of 100 KHz per second for the frequency bandwidth of Channel 1. These rates of change can be based on the maximum rates of change of the receiver 153.

The bandwidth controller 161 can provide data that specifies, for each communication parameter that is going to be adjusted, the determined start time, the target value, and the rate of change for the communication parameter to the satellite gateway of the wireless communication channel to which the communication parameter applies. In the example of FIG. 1, the bandwidth controller 161 provides, for Channel 1, data specifying the determined start time, the target value for the center frequency (30.02 GHz), the target bandwidth (160 MHz), the rate of change for the center frequency (50 KHz per second), and the rate of change for the bandwidth (100 KHz per second) to the satellite gateway 150. If the bandwidth controller 161 determined to adjust the communication parameters for another wireless communication channel, the bandwidth controller 161 can provide similar data to the satellite gateway that exchanges data using the other wireless communication channel.

In stage (F), the transmitter 152 of the satellite gateway 159 transmits channel parameter data 170 to the satellite 140. The channel parameter data 170 includes data specifying, for Channel 1, the determined start time for the center frequency adjustment, the start time for the frequency bandwidth adjustment (which may be the same as or different from the start time of the center frequency), the target value for the center frequency (30.02 GHz), the target bandwidth (160 MHz), the rate of change for the center frequency (50 KHz per second), and the rate of change for the bandwidth (100 KHz per second). In stage (G), the satellite 140 forwards the channel parameter data 170 to the terminal 120.

In some implementations, the channel parameter data 170 is also provided to the receiver 153. In this way, the receiver 153 can adapt to the adjustments to the communication parameters as the adjustments occur. For example, the receiver 153 will know the center frequency and the frequency bandwidth of Channel 1 on which the transmitter 124 will be transmitting data at any given time based on the start time(s) and the rate(s) of change.

In stage (H), a channel adjuster 128 gradually adjusts the center frequency and the frequency bandwidth of the transmitter 124 based on the channel data 170. The channel adjuster 128 can start adjusting the center frequency of the transmitter 124 when the current time equals the start time for the center frequency adjustment. Similarly, the channel adjuster 128 can start adjusting the frequency bandwidth of the transmitter 124 when the current time equals the start time for the frequency bandwidth adjustment.

The channel adjuster 128 can gradually adjust the center frequency for the transmitter 124 based on the rate of change for the center frequency specified by the channel parameter data 170. The channel adjuster 128 can change the center frequency continuously or incrementally. For example, the channel adjuster 128 can adjust the center frequency continuously at a rate equal to the rate of change for the center frequency. In another example, the channel adjuster 128 can adjust the center frequency incrementally, e.g., every 100 milliseconds, each second, or based on another appropriate time period). The channel adjuster 128 can send data to the transmitter 124 specifying the adjusted center frequency. In turn, the channel adjuster 128 can adjust the center frequency of Channel 1 on which the transmitter 124 is transmitting data.

Similarly, the channel adjuster 128 can gradually adjust the frequency bandwidth for the transmitter 124 based on the rate of change for the rate of change for the frequency bandwidth specified by the channel parameter data 170. The channel adjuster 128 can change the frequency bandwidth continuously or incrementally. For example, the channel adjuster 128 can adjust the frequency bandwidth continuously at a rate equal to the rate of change for the frequency bandwidth. In another example, the channel adjuster 128 can adjust the frequency bandwidth incrementally, e.g., every 100 milliseconds, each second, or based on another appropriate time period). The channel adjuster 128 can send data to the transmitter 124 specifying the adjusted frequency bandwidth. In turn, the transmitter 124 can adjust the frequency bandwidth of Channel 1 on which the transmitter 124 is transmitting data 124.

The channel adjuster 128 can adjust the center frequency based on the rate of change for the center frequency until the center frequency reaches the target value for the center frequency specified by the channel parameter data 170. Similarly, the channel adjuster 128 can adjust the frequency bandwidth for the frequency bandwidth based on the rate of change until the frequency bandwidth reaches the target value for the frequency bandwidth specified by the channel parameter data 170.

In some implementations, the transmitter 124 is configured to adjust the center frequency and/or frequency bandwidth based on the rate of change for each communication parameter. In this example, the transceiver 122 would not need a channel adjuster 128.

In the example of FIG. 1, the channel adjuster 128 gradually adjusts the center frequency of the transmitter 124 (the center frequency of Channel 1) using the rate of change of 50 KHz per second until the center frequency reaches the target value of 30.02 GHz. Based on the rate of change for the center frequency, this adjustment to the center frequency would take 400 seconds (20 MHZ/50 KHz per second). Similarly, the channel adjuster 128 gradually adjusts the frequency bandwidth of the transmitter 124 (the frequency bandwidth of Channel 1) using the rate of change of 100 KHz per second until the frequency bandwidth reaches the target value of 160 MHz. Based on the rate of change for the frequency bandwidth, this adjustment to the frequency bandwidth would take 600 seconds (60 MHZ/100 KHz per second).

The transmitter 124 and/or the receiver 153 can determine the time period in which the adjustment will take place based on the start time(s) and the rates of change. In this example, the transmitter 124 and the receiver 153 can determine that the adjustment to the center frequency will occur during a 400 second time period that will begin at the start time for the center frequency by dividing the adjustment to the center frequency (20 MHz) by the rate of change for the center frequency (50 KHz per second). Similarly, the transmitter 124 and the receiver 153 can determine that the adjustment to the frequency bandwidth will occur during a 500 second time period beginning at the start time for the frequency bandwidth by dividing the adjustment to the frequency bandwidth (60 MHz) by the rate of change for the frequency bandwidth (100 KHz per second).

At time T0, the center frequency for Channel 1 is 30 GHz, the value before the adjustment. The lower frequency of Channel 1 is 29.050 GHz and the upper band of Channel 1 is 30.050 GHz at time T0. This provides the initial frequency bandwidth of 100 MHz.

At time T1, which is one second after the channel adjuster 128 began adjusting the center frequency and the frequency bandwidth of Channel 1, the center frequency of the transmitter 124 is 30.00005 GHz, which is 50 KHz greater than the center frequency before the adjustment began. Similarly, a time T1, the frequency bandwidth of the transmitter 124 is 100.010 GHz (30.05005 GHz-29.04995 GHz), which is 100 KHz greater than the frequency bandwidth before the adjustment began. At time T0+600 seconds, both communication parameters have reached their respective target values. The transmitter 124 can continue transmitting data using the target center frequency and the target frequency bandwidth, e.g., until receiving new channel parameter data 170.

During the adjustment to the center frequency and the frequency bandwidth of Channel 1, the transmitter 124 and the receiver 153 can maintain an active wireless communication link on Channel 1. For example, the transmitter 124 can continue transmitting data during the adjustment using the current center frequency and the current frequency bandwidth at the time of the transmission. For example, at time T1, the transmitter 124 can transmit data using Channel 1 which, at that time, would have a center frequency of 30.00005 GHz and a frequency bandwidth of 100.010 GHz. As the adjustment to the center frequency and the adjustment to the frequency bandwidth are less than or equal to the respective maximum rates of the receiver 153, the receiver 153 can receive the data transmitted at time T1 (and throughout entire adjustment) over Channel 1 without disruption to Channel 1.

The transmitter 124 can transmit more data at time T2 (not shown), which may be one second after T1. In this example, the transmitter 124 can transmit data using Channel 1 which, at that time, would have a center frequency of 30.00010 GHz and a frequency bandwidth of 100.020 GHz. As the adjustment to the center frequency and the adjustment to the frequency bandwidth are less than or equal to the respective maximum rates of the receiver 153, the receiver 153 can receive the data transmitted at time T2 over Channel 1 without disruption to Channel 1.

In some implementations, the adjustments at the transmitter 124 are made based on a different frequency band than the frequency band at which the terminal 120 transmits data to the satellite 140. For example, the transmitter 124 may prepare data for transmission on the L-band (e.g., 1-2 GHz) and the terminal 120 can convert the output of the transmitter 124 to the Ka-band or Ku-band. In this example, the channel adjuster 128 (or transmitter 124) can convert the target values and rates of change from the Ka-band or Ku-band to the L-band before gradually making the adjustments. In another example, the rates of change may be stored in terms of L-band rates of change and the target values may be specified in terms of L-band frequencies.

Although the example of FIG. 1 is described in terms of adjusting the communication parameters of a transmitter of a satellite terminal, the same (or similar) techniques can be used to adjust the communication parameters of a transmitter of a satellite gateway. In this example, the rates of change of the communication parameters can be based on maximum rates of change for the satellite terminal's receiver. Further, the same techniques of re-defining a wireless communication channel while maintaining an active connection can be used in wireless communications systems other than satellite systems. For example, for any appropriate wireless communication links, a system can determine a tracking capability of a receiver and effectuate changes to channel parameters in a gradual manner, e.g., using incremental changes carried out in a coordinated, predetermined manner. The definition of a channel used by a transmitter and receiver can be gradually changed, rather than disrupting communication by switching between use of two different pre-defined channels.

Figure 2:
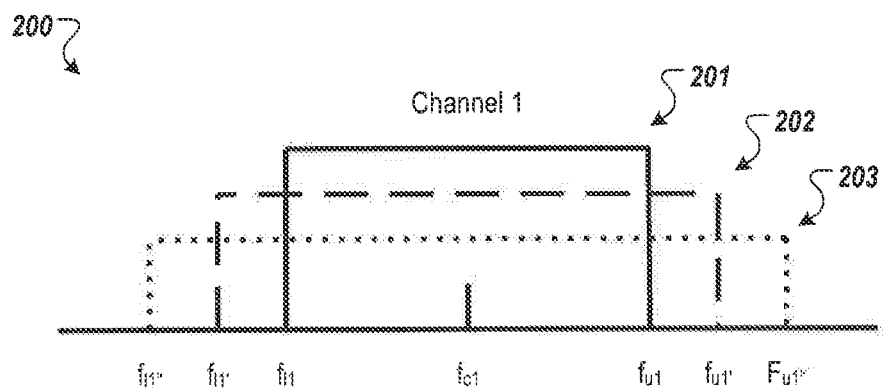
FIG. 2 is a diagram that illustrates an adjustment to the communication channel bandwidth of a wireless communication channel.

FIG. 2 is a diagram 200 that illustrates an adjustment to the communication channel bandwidth of a wireless communication channel (Channel 1). Initially (e.g., before an adjustment to the communication parameter(s) of Channel 1), Channel 1 has a center frequency ($f_{c1}$), a lower frequency ($f_{l1}$), and an upper frequency ($f_{u1}$). Channel 1 has a frequency bandwidth of $f_{u1}$-$f_{l1}$.

In this example, the frequency bandwidth of Channel 1 is being increased, but the center frequency of Channel 1 is not being adjusted as there are no other wireless communication channels that would be affected by the increase in frequency bandwidth of Channel 1. The frequency bandwidth of Channel 1 can be adjusted gradually based on a rate of change for the frequency bandwidth of Channel 1 until a target value for the frequency bandwidth of Channel 1 is reached.

After a first period of time during the adjustment, the frequency bandwidth of Channel 1 has increased from initial Channel 1 (201) to intermediate Channel 1 (202). The frequency bandwidth of intermediate Channel 1 (202) is the difference between the upper frequency ($f_{u1'}$) of intermediate Channel 1 (202) and the lower frequency ($f_{l1'}$) of intermediate Channel 1 (202). As the center frequency is not being adjusted, the upper frequency and the lower frequency can be adjusted the same amount.

After more time has elapsed, the frequency bandwidth of Channel 1 has increased from intermediate Channel 1 (202) to target Channel 1 (203). The frequency bandwidth of target Channel 1 (203) is the difference between the upper frequency ($f_{u1''}$) of intermediate Channel 1 (202) and the lower frequency ($f_{l1''}$) of target Channel 1 (203).

Figure 3:
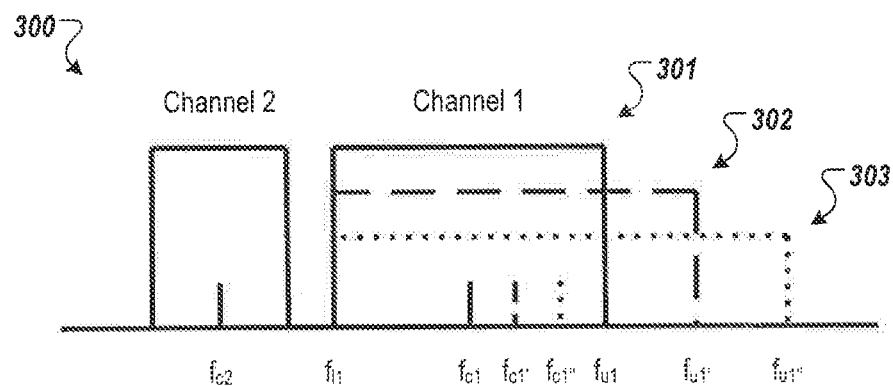
FIG. 3 is a diagram that illustrates an adjustment to the communication channel bandwidth of a wireless communication channel.

FIG. 3 is a diagram 300 that illustrates an adjustment to the communication channel bandwidth of a wireless communication channel (Channel 1). Initially (e.g., before an adjustment to the communication parameter(s) of Channel 1), Channel 1 has a center frequency ($f_{c1}$), a lower frequency ($f_{u1}$), and an upper frequency ($f_{l1}$). Channel 1 has a frequency bandwidth of $f_{u1}$-$f_{l1}$.

In this example, there is another wireless communication channel (Channel 2) adjacent to Channel 1. If the frequency bandwidth of Channel 1 was increased without either increasing the center frequency ($f_{c1}$) of Channel 1 or shifting Channel 2 to a lower frequency band (e.g., to the left), the lower frequencies of Channel 1 would overlap with Channel 2 and cause interference between Channel 1 and Channel 2.

Thus, in this example, the frequency bandwidth of Channel 1 is gradually increased and the center frequency of Channel 1 is gradually increased to prevent the overlap and prevent the interference.

After a first period of time during the adjustment, the frequency bandwidth of Channel 1 has increased from initial Channel 1 (301) to intermediate Channel 1 (302). The center frequency of Channel 1 has also increased from the initial center frequency ($f_{c1}$) to intermediate center frequency ($fc_{1'}$). The frequency bandwidth of intermediate Channel 1 (302) is the difference between the upper frequency ($f_{u1'}$) of intermediate Channel 1 (302) and the lower frequency ($f_{l1}$) of intermediate Channel 1 (302).

After more time has elapsed, the frequency bandwidth of Channel 1 has increased from intermediate Channel 1 (302) to target Channel 1 (303). The center frequency of Channel 1 has also increased from intermediate center frequency ($f_{c1'}$) to target center frequency ($f_{c1''}$). The frequency bandwidth of target Channel 1 (303) is the difference between the upper frequency ($f_{u1''}$) of target Channel 1 (302) and the lower frequency ($f_{l1}$) of target Channel 1 (303).

In this example, the lower frequency ($f_{l1}$) of Channel 1 did not move from its initial value. In other examples, the lower frequency may fluctuate, e.g., depending on the rate at which the center frequency and the frequency bandwidth of Channel 1 are adjusted. For example, if the frequency bandwidth was adjusted at a faster rate than the center frequency, the lower frequency may decrease below the initial value of the lower frequency until the center frequency is adjusted enough to bring the lower frequency back to its initial value. The start times of the adjustments to the center frequency and the frequency bandwidth of Channel 1 can be determined to prevent the lower frequency from decreasing such that the frequency band of Channel 1 overlaps with the frequency band of Channel 2.

Figure 4:
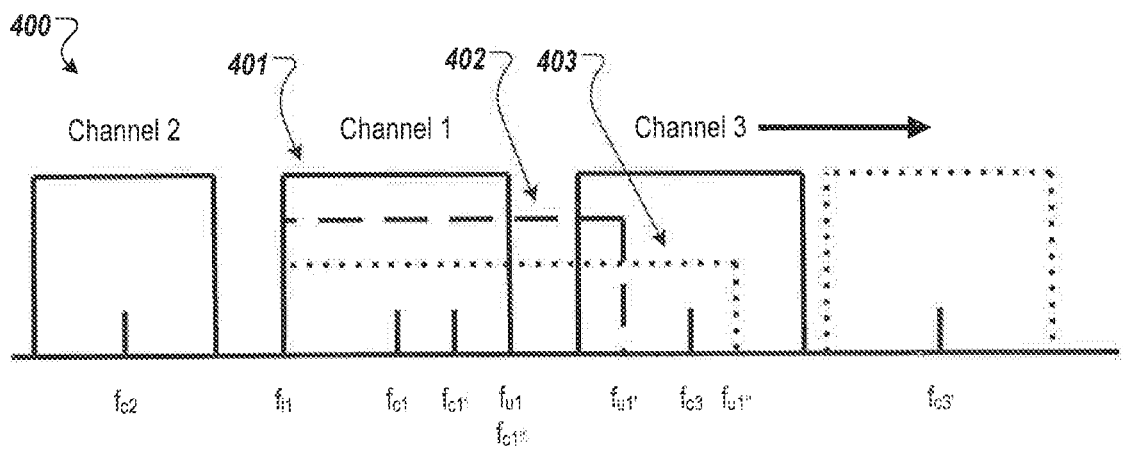
FIG. 4 is a diagram that illustrates adjustments to the communication channel bandwidth of multiple wireless communication channels.

FIG. 4 is a diagram 400 that illustrates adjustments to the communication channel bandwidth of multiple wireless communication channels (Channel 1 and Channel 3). Initially (e.g., before an adjustment to the communication parameter(s) of Channel 1), Channel 1 has a center frequency ($f_{c1}$), a lower frequency ($f_{l1}$), and an upper frequency ($f_{u1}$). Channel 1 has a frequency bandwidth of $f_{u1}$-$f_{l1}$.

In this example, there is another wireless communication channel (Channel 2) adjacent to Channel 1 on the lower frequency side of Channel 1 and another wireless communication channel (Channel 3) on the upper frequency side of Channel 1. Thus, increasing the bandwidth of Channel 1 to its target frequency bandwidth would cause Channel 1 to overlap with Channel 2 and/or Channel 3. To prevent such overlap and the interference that would result, Channel 3 is shifted to a higher frequency band and Channel 1 is adjusted such that its frequency band extends into the previous frequency band of Channel 3.

After a first period of time during the adjustment, the initial center frequency of Channel 3 ($f_{c3}$) is increased to an intermediate center frequency ($f_{c3'}$). This shifts the frequency band of Channel 3 away from the frequency band of Channel 1. The frequency bandwidth of Channel 1 has also increased from initial Channel 1 (401) to intermediate Channel 1 (402). The center frequency of Channel 1 has also increased from the initial center frequency ($f_{c1}$) to intermediate center frequency ($fc_{1'}$). The frequency bandwidth of intermediate Channel 1 (402) is the difference between the upper frequency ($f_{u1'}$) of intermediate Channel 1 (402) and the lower frequency ($f_{l1}$) of intermediate Channel 1 (402).

After more time has elapsed, the frequency bandwidth of Channel 1 has increased from intermediate Channel 1 (402) to target Channel 1 (403). The center frequency of Channel 1 has also increased from intermediate center frequency ($f_{c1'}$) to target center frequency ($f_{c1''}$). The frequency bandwidth of target Channel 1 (303) is the difference between the upper frequency ($f_{u1''}$) of target Channel 1 (403) and the lower frequency ($f_{l1}$) of target Channel 1 (403).

As shown in FIG. 4, the frequency band of target Channel 1 does not overlap with the frequency band of shifted Channel 3. The communication parameters of Channel 1 and Channel 3 can be adjusted gradually and coordinated such that their frequency bands do not overlap at any point during the adjustments. For example, the start times for the adjustments can be determined based on the rates of change and the initial values for the communication parameters of both channels such that the lower frequency of Channel 3 is shifted prior to the upper frequency of Channel 1 would overlap with the lower frequency of Channel 3.

Figure 5:
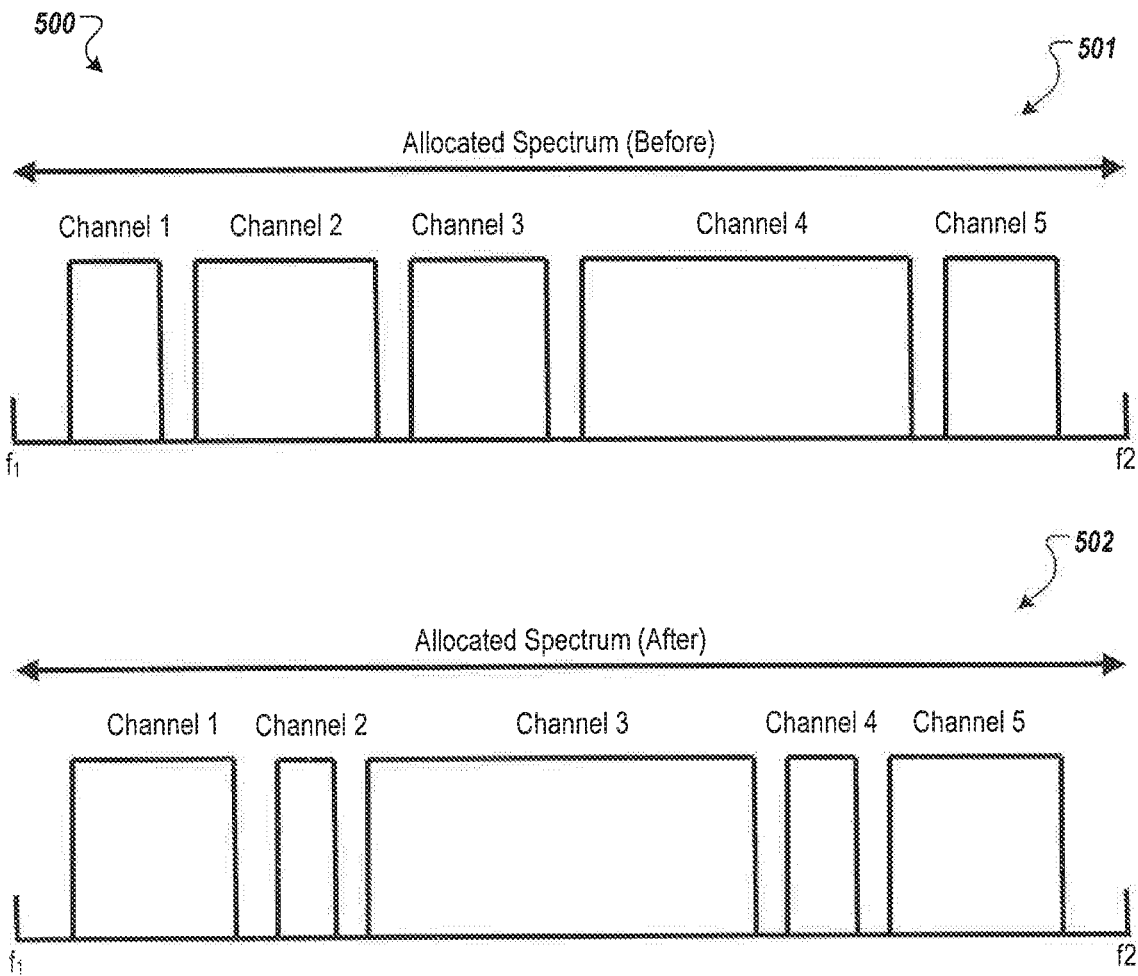
FIG. 5 is a diagram that illustrates adjustments to the communication channel bandwidth of multiple wireless communication channels.

FIG. 5 is a diagram 500 that illustrates adjustments to the communication channel bandwidth of multiple wireless communication channels (Channels 1-5). In this example, the frequency bandwidth of some channels is increased and the frequency bandwidth of some channels is reduced. The diagram 500 includes a before frequency spectrum 501 that shows the frequency bands of Channels 1-5 before the adjustment and an after frequency spectrum 502 that shows the frequency bands of Channels 1-5 after the adjustment.

The adjustments to the communication parameters of Channels 1-5 can be coordinated such that the frequency bands of the channels do not overlap at any time during the adjustment. For example, the frequency bandwidth of Channel 2 is being reduced and the frequency bandwidths of adjacent Channels 1 and 3 are being expanded into the frequency band previously occupied by Channel 2. In this example, the start time for the adjustments to the communication parameters of Channels 1-3 can be determined such that the frequency band of Channel 2 is reduced before the adjustments to the frequency band of Channel 1 and the frequency band of Channel 3 causes Channel 1 or Channel 3 to overlap with Channel 2.

Figure 6:
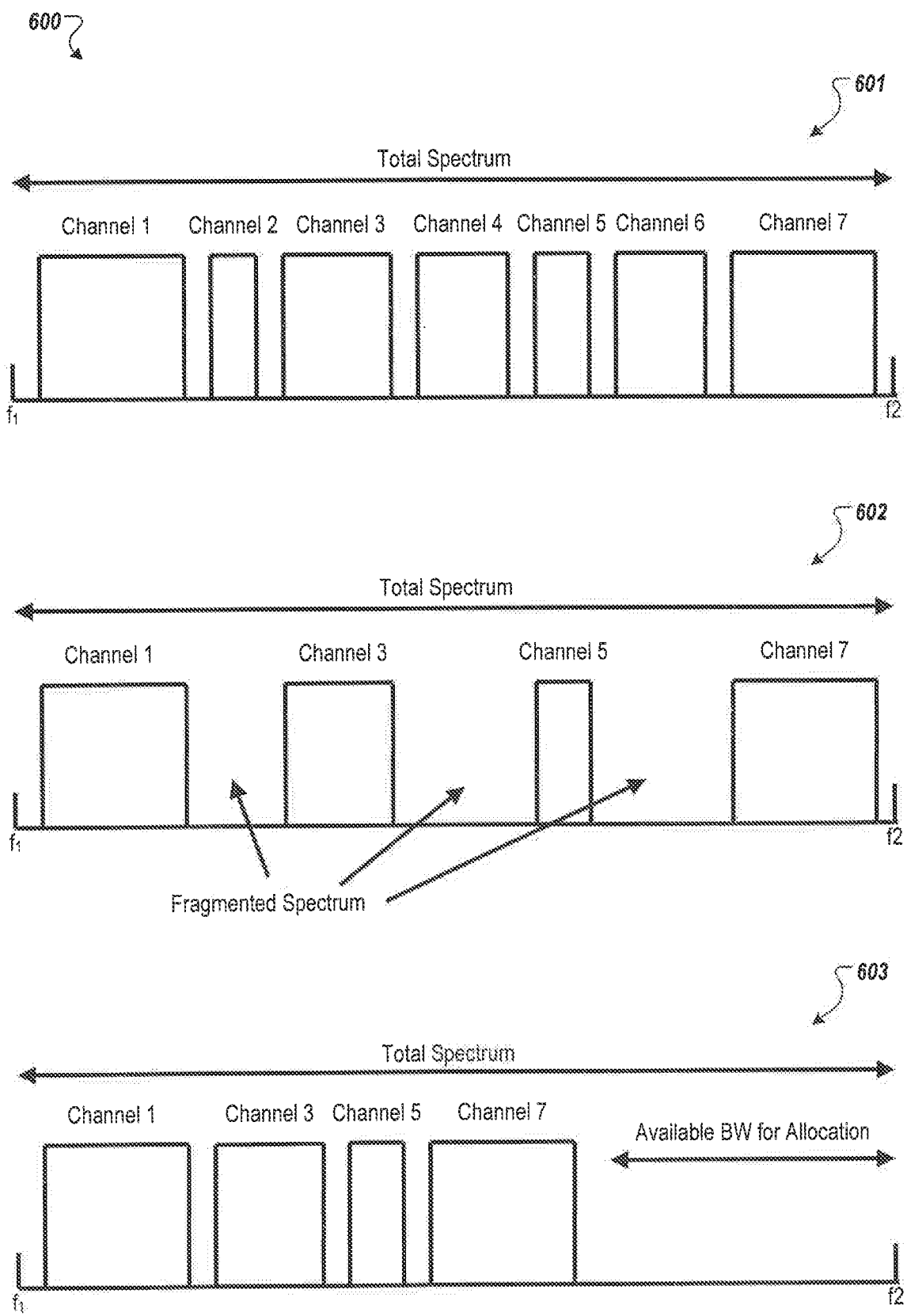
FIG. 6 is a diagram that illustrates adjustments to multiple wireless communication channels.

FIG. 6 is a diagram 600 that illustrates adjustments to multiple wireless communication channels. In this example, some wireless communication channels are removed from the frequency spectrum and the remaining wireless communication channels are shifted to provide available bandwidth for wireless communication channels to be added to the frequency spectrum.

The diagram 600 includes an initial frequency spectrum 601 that includes seven wireless communication channels (Channels 1-7). The diagram 600 also includes an intermediate frequency spectrum 602. In the intermediate frequency spectrum 602, Channels 2, 4, and 6 have been removed. For example, the satellite terminals that were communicating over Channels 2, 4, and 6 may have been deactivated. The removal of Channels 2, 4, and 6 results in a fragmented spectrum in which there is extra bandwidth (e.g., more than a minimum amount used to separate channels to prevent interference) between pairs of wireless communication channels. If the fragmented frequency spectrum is not adjusted, any new wireless communication channel to be added to the frequency spectrum would have to fit in one of the spaces left by Channels 2, 4, and 6 or wait until the remaining channels were adjusted to make room for the new channel.

As shown in the adjusted frequency spectrum 603, the remaining wireless communication channels (Channels 1, 3, 5, and 7) can be adjusted, e.g., to one side of the frequency spectrum, to make additional bandwidth space for any new wireless communication channels. The remaining wireless communication channels can be shifted by gradually adjusting their respective center frequencies, as described above. The remaining wireless communication channels can be shifted in response to the other wireless communication channels being removed from the frequency spectrum, e.g., without waiting for a request to add a new wireless communication channel to the frequency spectrum. In this way, a new wireless communication channel can be allocated more bandwidth than one of the spaces left by Channel 2, 4, or 6, e.g., without waiting for the remaining channels to be shifted after receiving a request to add the new wireless communication channel.

Figure 7:
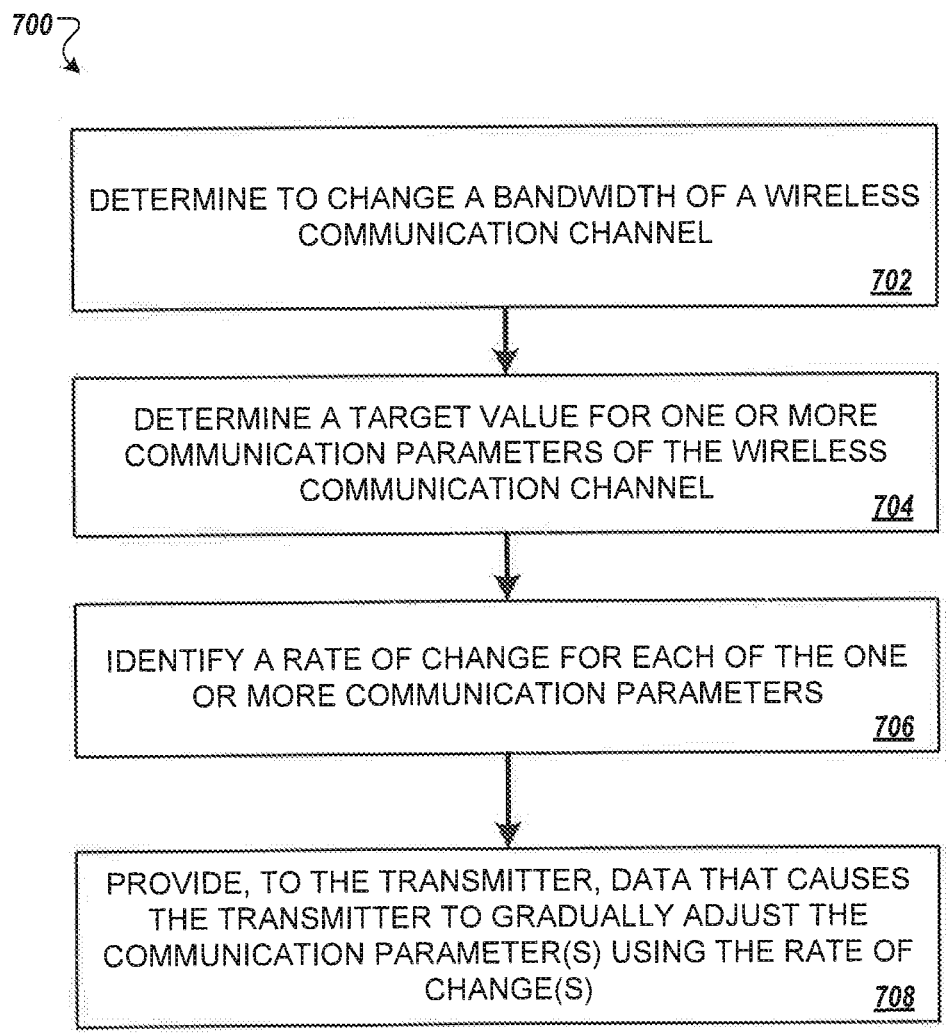
FIG. 7 is a flow diagram that illustrates an example process for adjusting communication channel bandwidth.

FIG. 7 is a flow diagram that illustrates an example process 700 for adjusting communication channel bandwidth. The process 700 may be performed by a system that includes one or more computers. The one or more computers can include one or more processors. The one or more computers can also include one or more data storage devices storing instructions that, when executed, cause the one or more computers to perform the actions of the process 700. The steps of the process 600 may be performed in the order shown in FIG. 7, or in another order.

In step (702), a determination is made to change a bandwidth of a wireless communication channel, e.g., a satellite communication channel on which a satellite terminal is transmitting data to a satellite gateway. For example, a determination can be made to expand the frequency bandwidth of the wireless communication channel in response to a request to expand the frequency bandwidth (e.g., received from a transmitter transmitting data over the wireless communication channel) or in response to historical bandwidth demand of the transmitter transmitting data over the wireless communication channel.

In another example, a determination may be made to adjust the frequency bandwidth of the wireless communication channel in response to an adjustment to a center frequency or frequency bandwidth of a different wireless communication channel. In another example, a determination may be made to adjust the frequency bandwidth of the wireless communication channel in response to an addition of a new communication channel to a frequency spectrum that includes the wireless communication channel or in response to removal of a wireless communication channel from the frequency spectrum. In yet another example, a determination may be made to adjust the frequency bandwidth of the wireless communication channel to make room in the frequency spectrum in case another wireless communication channel is added later.

In step (704), a target value for each of one or more communication parameters of the wireless communication channel is determined. The one or more communication parameters can include at least one of (i) a center frequency of the wireless communication channel or (ii) a frequency bandwidth of the wireless communication channel.

For example, a target frequency bandwidth for the wireless communication channel can be determined in response to the determination to adjust the frequency bandwidth of the wireless communication channel. The target frequency bandwidth can be determined based on an amount of additional (or less) frequency bandwidth requested (or needed) for the wireless communication channel and the amount of frequency bandwidth available.

A target value for the center frequency of the wireless communication channel can also be determined. For example, the frequency band of the wireless communication channel may be shifted based on the frequency band(s) of adjacent wireless communication channel(s) as described above. To shift the frequency band of the wireless communication channel, a target center frequency that accomplishes the shift can be determined. As described above, the communication parameters of other wireless communication channels can also be determined, e.g. to shift the wireless communication channels away from the wireless communication channel and make room for expanded bandwidth of the wireless communication channel.

In step (706), a rate of change is identified for each of the one or more communication parameters that are being adjusted is identified. The rate of change for each communication parameter can be a rate at which the communication parameter can be changed over time while continuing to transfer data on the wireless communication channel. For example, the rate of change for a communication parameter can be less than or equal to a maximum rate of change for which the receiver that is receiving data over the wireless communication channel is capable of tracking the changes and maintaining an active wireless communication channel with the transmitter that is transmitting data over the wireless communication channel.

In step (708), data is provided to each transmitter for which a communication parameter s being adjusted. The data provided to a transmitter can causes the transmitter to gradually adjust the communication parameter using the rate of change for the communication parameter until the communication parameter reaches the target value for the communication parameter. For example, the data provided to a transmitter can include, for each communication parameter of the transmitter being adjusted, the determined target value for the communication parameter and the identified rate of change for the communication parameter. Each transmitter can gradually (e.g., continuously or incrementally) adjust its communication parameter(s) using the rate of change for the communication parameter until the communication parameter reaches the target value for the communication parameter.

The data provided to a transmitter can also include a start time for each communication parameter of the transmitter being adjusted. For example, as described above, the starts times for the adjustments can be determined so that the frequency bands of the wireless communication channels do not overlap and cause interference during the adjustments to the communication parameters. Each transmitter can use the start time(s) for its communication parameter(s) to determine when to start the gradual adjustment to the communication parameter(s).

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computing devices, the method comprising:
   obtaining data indicating a target value for a communication parameter of a wireless communication channel on which a transmitter is configured to transmit data;
   identifying a maximum rate of change for the communication parameter, the maximum rate of change being a rate at which the communication parameter can be changed while data continues to be transferred on the wireless communication channel; and
   providing, to the transmitter, data that causes the transmitter to gradually adjust the communication parameter at a rate of change that is less than or equal to the maximum rate of change for the communication parameter until the communication parameter reaches the target value for the communication parameter.

2. The method of claim 1, wherein the communication parameter comprises at least one of a center frequency of the wireless communication channel or a frequency bandwidth of the wireless communication channel.

3. The method of claim 1, wherein:
   the transmitter communicates with a receiver over the wireless communication channel; and
   whenever the communication parameter is adjusted at a rate that exceeds the maximum rate of change, communication between the transmitter and the receiver over the wireless communication channel is disrupted.

4. The method of claim 1, wherein:
   adjusting the communication parameter by an amount that is equal to a magnitude of difference between the target value for the communication parameter and a current value of the communication parameter disrupts communication between the transmitter and a received over the wireless communication channel; and
   the transmitter and received maintain communications over the wires communication channel when the communication parameter is adjusted at a rate of change that is less than or equal to the maximum rate of change for the communication parameter.

5. The method of claim 1, wherein:
   the transmitter communicates with a receiver over the wireless communication channel; and
   the receiver tracks the communication parameter during the gradual adjustment to the communication parameter and continues to receive data from the transmitter during the gradual adjustment.

6. The method of claim 5, wherein, in response to the transmitter adjusting the communication parameter at a second rate of change that exceeds the maximum rate of change for the communication parameter, the receiver fails to track the communication parameter and communication between the transmitter and the receiver over the wireless communication channel is disrupted.

7. The method of claim 1, wherein:
   the transmitter comprises a satellite transmitter that communicates with a satellite receiver; and
   the satellite transmitter transmits data to the satellite receiver by way of a satellite and using a satellite communication link over the wireless communication channel.

8. The method of claim 1, wherein:
   the transmitter gradually adjusts the communication parameter over a time period;
   the transmitter maintains an active communication link with a received over the wireless communication channel during the time period;

the receiver receives, from the transmitter, multiple data transmissions over the wireless communication channel during the time period; and a value of each of communication parameter is different for at least two of the data transmissions.

9. A system comprising:

a data processing apparatus; and a computer storage medium storing instructions that, when executed by the data processing apparatus, cause the data processing apparatus to perform operations comprising:

obtaining data indicating a target value for a communication parameter of a wireless communication channel on which a transmitter is configured to transmit data;

identifying a maximum rate of change for the communication parameter, the maximum rate of change being a rate at which the communication parameter can be changed while data continues to be transferred on the wireless communication channel; and providing, to the transmitter, data that causes the transmitter to gradually adjust the communication parameter at a rate of change that is less than or equal to the maximum rate of change for the communication parameter until the communication parameter reaches the target value for the communication parameter.

10. The system of claim 9, wherein the communication parameter comprises at least one of a center frequency of the wireless communication channel or a frequency bandwidth of the wireless communication channel.

11. The system of claim 9, wherein:

the transmitter communicates with a receiver over the wireless communication channel; and whenever the communication parameter is adjusted at a rate that exceeds the maximum rate of change, communication between the transmitter and the receiver over the wireless communication channel is disrupted.

12. The system of claim 9, wherein:

adjusting the communication parameter by an amount that is equal to a magnitude of difference between the target value for the communication parameter and a current value of the communication parameter disrupts communication between the transmitter and a received over the wireless communication channel; and the transmitter and received maintain communications over the wires communication channel when the communication parameter is adjusted at a rate of change that is less than or equal to the maximum rate of change for the communication parameter.

13. The system of claim 9, wherein:

the transmitter communicates with a receiver over the wireless communication channel; and the receiver tracks the communication parameter during the gradual adjustment to the communication parameter and continues to receive data from the transmitter during the gradual adjustment.

14. The system of claim 13, wherein, in response to the transmitter adjusting the communication parameter at a second rate of change that exceeds the maximum rate of change for the communication parameter, the receiver fails to track the communication parameter and communication between the transmitter and the receiver over the wireless communication channel is disrupted.

15. The system of claim 9, wherein:

the transmitter comprises a satellite transmitter that communicates with a satellite receiver; and the satellite transmitter transmits data to the satellite receiver by way of a satellite and using a satellite communication link over the wireless communication channel.

16. The system of claim 9, wherein:

the transmitter gradually adjusts the communication parameter over a time period;

the transmitter maintains an active communication link with a received over the wireless communication channel during the time period;

the receiver receives, from the transmitter, multiple data transmissions over the wireless communication channel during the time period; and a value of each of communication parameter is different for at least two of the data transmissions.

17. A non-transitory computer readable medium comprising instructions that, when executed by a data processing apparatus, cause the data processing apparatus to perform operations comprising:

obtaining data indicating a target value for a communication parameter of a wireless communication channel on which a transmitter is configured to transmit data;

identifying a maximum rate of change for the communication parameter, the maximum rate of change being a rate at which the communication parameter can be changed while data continues to be transferred on the wireless communication channel; and providing, to the transmitter, data that causes the transmitter to gradually adjust the communication parameter at a rate of change that is less than or equal to the maximum rate of change for the communication parameter until the communication parameter reaches the target value for the communication parameter.

18. The non-transitory computer readable medium of claim 17, wherein the communication parameter comprises at least one of a center frequency of the wireless communication channel or a frequency bandwidth of the wireless communication channel.

19. The non-transitory computer readable medium of claim 17, wherein:

the transmitter communicates with a receiver over the wireless communication channel; and whenever the communication parameter is adjusted at a rate that exceeds the maximum rate of change, communication between the transmitter and the receiver over the wireless communication channel is disrupted.

20. The non-transitory computer readable medium of claim 17, wherein:

adjusting the communication parameter by an amount that is equal to a magnitude of difference between the target value for the communication parameter and a current value of the communication parameter disrupts communication between the transmitter and a received over the wireless communication channel; and the transmitter and received maintain communications over the wires communication channel when the communication parameter is adjusted at a rate of change that is less than or equal to the maximum rate of change for the communication parameter.

* * * * *